(12) United States Patent
Zhou et al.

(10) Patent No.: US 10,890,481 B2
(45) Date of Patent: *Jan. 12, 2021

(54) ULTRASONIC MICROPHONE AND ULTRASONIC ACOUSTIC RADIO

(71) Applicant: The Regents of the University of California, Oakland, CA (US)

(72) Inventors: Qin Zhou, Fremont, CA (US); Alexander K. Zettl, Kensington, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/773,796

(22) Filed: Jan. 27, 2020

(65) Prior Publication Data

US 2020/0182686 A1 Jun. 11, 2020

Related U.S. Application Data

(63) Continuation of application No. 15/558,467, filed as application No. PCT/US2016/019373 on Feb. 24, 2016, now Pat. No. 10,641,651.

(60) Provisional application No. 62/133,804, filed on Mar. 16, 2015, provisional application No. 62/143,565, filed on Apr. 6, 2015.

(51) Int. Cl.
| | |
|---|---|
| *G01H 11/06* | (2006.01) |
| *H04R 19/00* | (2006.01) |
| *G01S 15/10* | (2006.01) |
| *G08B 1/08* | (2006.01) |
| *G01H 3/12* | (2006.01) |
| *G06F 3/03* | (2006.01) |

(52) U.S. Cl.
CPC ............ *G01H 11/06* (2013.01); *G01S 15/104* (2013.01); *G08B 1/08* (2013.01); *H04R 19/005* (2013.01); *G01H 3/12* (2013.01); *G06F 3/0325* (2013.01)

(58) Field of Classification Search
None
See application file for complete search history.

(56) References Cited

U.S. PATENT DOCUMENTS

| | | | |
|---|---|---|---|
| 4,655,086 | A | 4/1987 | Mielnicka-Pate et al. |
| 8,270,253 | B1 | 9/2012 | Roche et al. |
| 2003/0052970 | A1 | 3/2003 | Dodds et al. |
| 2007/0121097 | A1 | 5/2007 | Boillot |
| 2008/0025531 | A1 | 1/2008 | Suzuki et al. |

(Continued)

OTHER PUBLICATIONS

IEEE Standard Information Network, "IEEE 100 The Authoritative Dictionary of IEEE Standards Terms," IEEE Standard Information Network, New York, Oct. 2000. (Year: 2000).

(Continued)

*Primary Examiner* — Kenny H Truong
(74) *Attorney, Agent, or Firm* — Womble Bond Dickinson (US) LLP

(57) ABSTRACT

This disclosure provides systems, methods, and apparatus related to an ultrasonic microphone and an ultrasonic acoustic radio. In one aspect a system includes a transmitter and a receiver. The receiver comprises a membrane. The membrane comprises a single layer or multiple layers of a two-dimensional material. The receiver is operable to receive sound waves in a frequency range, with the frequency range being the ultrasonic frequency range.

38 Claims, 13 Drawing Sheets

(56) References Cited

U.S. PATENT DOCUMENTS

| | | |
|---|---|---|
| 2010/0142325 A1 | 6/2010 | Altman et al. |
| 2011/0255228 A1 | 10/2011 | Kimura et al. |
| 2012/0086307 A1 | 4/2012 | Kandori et al. |
| 2014/0270271 A1 | 9/2014 | Dehe et al. |
| 2014/0339012 A1* | 11/2014 | Richardson ............ H04M 1/20 |
| | | 181/202 |
| 2016/0014521 A1 | 1/2016 | Kim et al. |
| 2019/0058955 A1 | 2/2019 | Voutilainen et al. |

OTHER PUBLICATIONS

Bunch et al., "Electromechanical Resonators from Graphene Sheets", Science Magazine, vol. 315, pp. 490-493, Jan. 26, 2007.
Castellanos-Gomez, Andres, et al, "Mechanics of freely-suspended ultrathin layered materials," Oct. 8, 2014, Annalen der Physik (Berlin), vol. 527, No. 1-2, pp. 1-44.
PCT/US2016/019373, International Search report dated Jun. 9, 2016, 2 pages.

\* cited by examiner

FIG. 2A
FIG. 2B ↑ CVD
FIG. 2C ↓ Backside plasma etch
FIG. 2D ↑ PMMA
FIG. 2E ↓ Supporting frame
FIG. 2F ↓ Nickel etch
FIG. 2G → PMMA removal
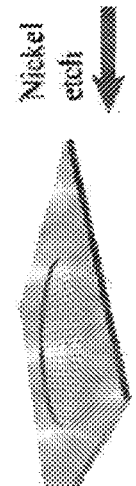
FIG. 2H ↑ Spacers and wiring
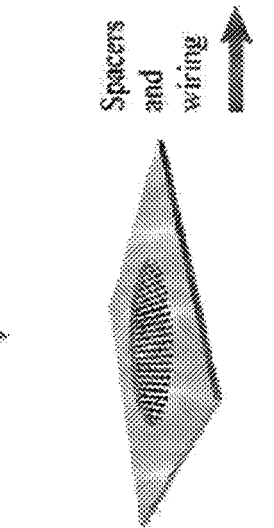
FIG. 2I ↑ Electrodes and wiring

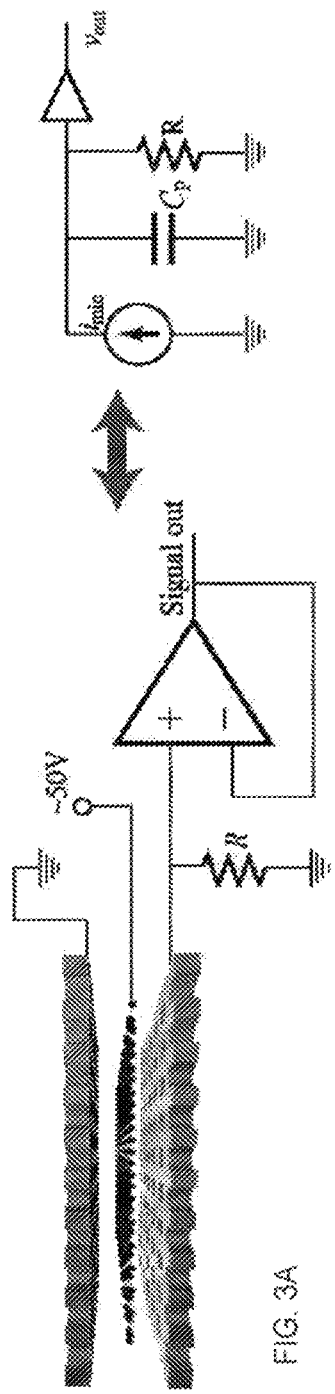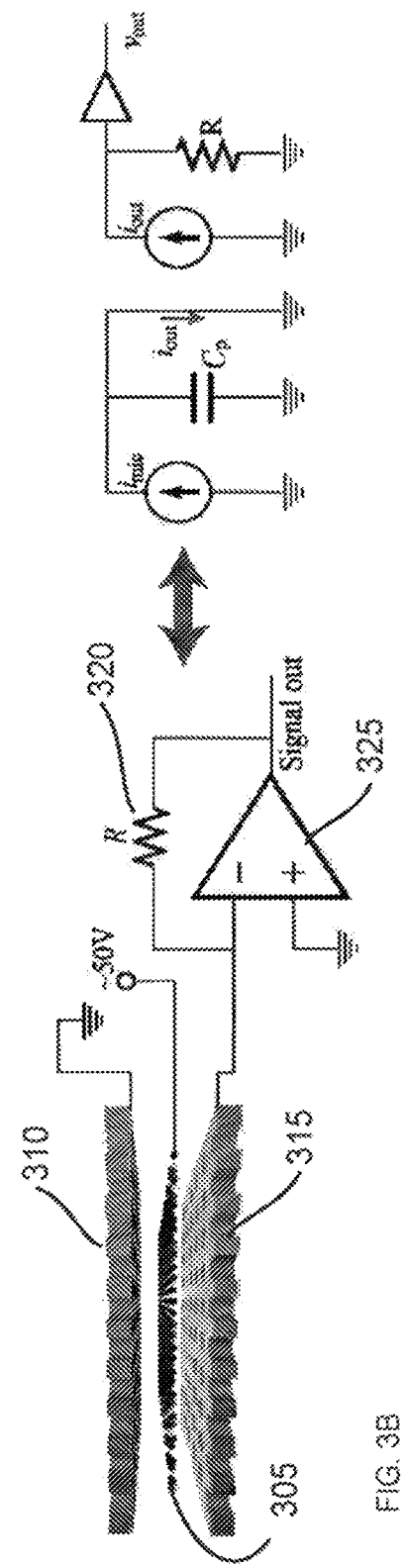
FIG. 3A
FIG. 3B

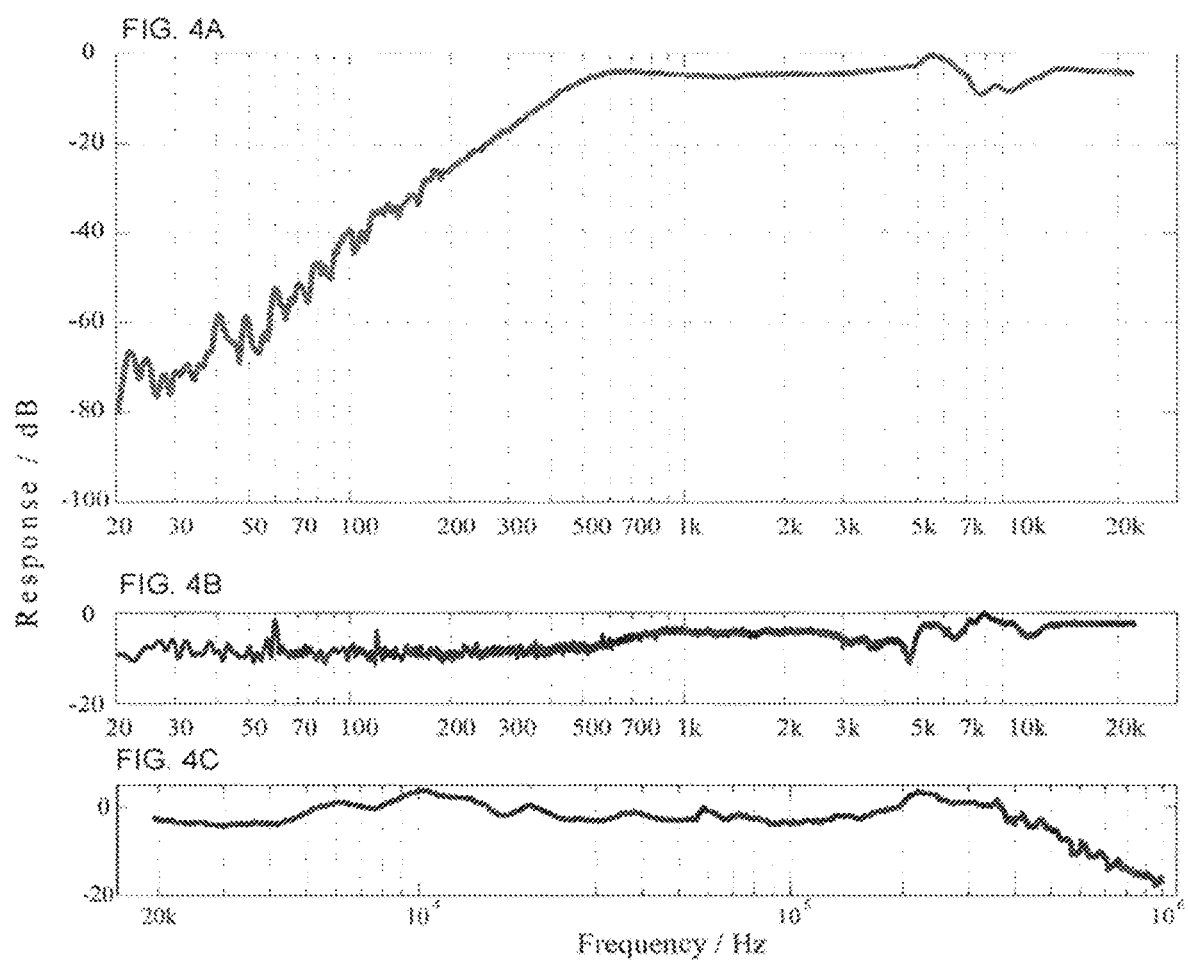

Voltage between membrane and the fixed electrode:

$$V = Ed = \frac{Q(d_0 + A\sin(\omega t))}{S\varepsilon}$$

Output voltage is the AC portion, so amplitude of V is proportional to A, the vibration amplitude.

ULTRASONIC MICROPHONE AND ULTRASONIC ACOUSTIC RADIO

RELATED APPLICATIONS

This application is a continuation of U.S. patent application Ser. No. 15/558,467, filed Sep. 14, 2017, which is a continuation of International Application Serial No. PCT/US2016/019373, filed Feb. 24, 2016, which claims priority to U.S. Provisional Patent Application Ser. No. 62/133,804, filed Mar. 16, 2015 and U.S. Provisional Patent Application Ser. No. 62/143,565, filed Apr. 6, 2015, all of which are herein incorporated by reference. This application is related to U.S. patent application Ser. No. 14/737,903, filed Jun. 12, 2015, which is herein incorporated by reference.

STATEMENT OF GOVERNMENT SUPPORT

This invention was made with government support under Contract No. DE-AC02-05CH11231 awarded by the U.S. Department of Energy, under Grant No. N00014-09-1066 awarded by the Office of Naval Research, and under Grant No. EEC-083819 awarded by the National Science Foundation. The government has certain rights in this invention.

TECHNICAL FIELD

This disclosure relates generally to devices capable of transmitting and receiving sound, and more particularly to devices capable of transmitting and receiving ultrasonic sound.

BACKGROUND

Modern wireless communication is based on generating and receiving electromagnetic (EM) waves that span a wide frequency range, from Hz to THz, providing abundant band resources. However, there are draw-backs to EM communication, including high extinction coefficient for electrically conductive materials and antenna size. On the other hand, animals have effectively used acoustic waves for short-range communication for millions of years. Acoustic wave based communication can overcome some of the EM difficulties.

For example, acoustic waves propagate well in conductive materials, and have thus been explored for underwater communication by submarines. Marine mammals such as whales and dolphins are known to communicate effectively via acoustic waves. In land-based acoustic wave communication, the audible band or acoustic band (i.e., about 20 Hz to 20 kHz, sounds that are capable of being heard by humans) is often occupied by human conversations, while the subsonic band can be disturbed by moving vehicles and building construction.

The ultrasonic band, while having a wide frequency span and often free of disturbance, is rarely exploited for high data rate communication purposes. The ultrasonic band is frequencies that are greater than the upper limit of the human hearing range, and is generally taken to be greater than about 20 kHz. One important reason that the ultrasonic band is rarely used is the lack of wide bandwidth ultrasonic generators and receivers. Conventional piezoelectric-based transducers only operate at one resonance frequency, preventing use in communications where wider bandwidth is needed for embedding information streams.

SUMMARY

Described herein is a wideband ultrasonic acoustic radio comprising graphene based electrostatic acoustic wave generators and receivers. The acoustic transducers display outstanding flat frequency response over the entire human audible region (i.e., about 20 Hz-20 kHz) as well as into the ultrasonic regime (i.e., to at least 0.5 MHz). Frequency sweeping ultrasonic bat calls were successfully recorded. Amplitude modulated transmission of information at 0.3 MHz was demonstrated. The ultrasonic acoustic radio pair also provides a novel way for range finding using the interference between acoustic and electromagnetic signals.

One innovative aspect of the subject matter described in this disclosure can be implemented in a system including a transmitter and a receiver. The receiver includes a membrane, and the membrane comprises a single layer or multiple layers of a two-dimensional material. The receiver is operable to receive sound waves in a frequency range, with the frequency range being the ultrasonic frequency range.

In some embodiments, the membrane comprises a graphene membrane. In some embodiments, the receiver further includes a first electrode proximate a first side of the membrane and a circuit associated with the first electrode. The circuit is operable to measure a velocity of vibration of the membrane, wherein the vibration is caused by the sound waves.

Another innovative aspect of the subject matter described in this disclosure can be implemented in a method including generating sound waves having a frequency with a transmitter and receiving the sound waves with a receiver. The frequency of the sound waves is in the ultrasonic frequency range. The receiver includes a membrane, and the membrane comprises a single layer or multiple layers of a two-dimensional material.

In some embodiments, the membrane comprises a graphene membrane. In some embodiments, the transmitter includes a second membrane, and the second membrane comprises a single layer or multiple layers of a two-dimensional material. In some embodiments, the receiver further includes a first electrode proximate a first side of the membrane and a circuit associated with the first electrode. The circuit is operable to measure a velocity of vibration of the membrane, wherein the vibration is caused by the sound waves.

Another innovative aspect of the subject matter described in this disclosure can be implemented in a device including a membrane comprising a single layer or multiple layers of a two-dimensional material, a first electrode proximate a first side of the membrane, and a circuit associated with the first electrode. The circuit is operable to measure a velocity of vibration of the membrane, the vibration being caused by sound waves.

In some embodiments, the device further includes a frame supporting the membrane. The frame includes a substantially circular open region that defines a substantially circular portion of the membrane. In some embodiments, the circuit includes a resistor and an amplifier. The membrane is connected to a voltage source. The first electrode is connected to a negative input of the amplifier. A positive input of the amplifier is connected to ground. The resistor is connected to the negative input of the amplifier and an output of the amplifier.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 2A-2I show examples of schematic illustrations of a graphene microphone at various stages in the fabrication process.

FIGS. 3A and 3B show examples of the operating principles of a graphene microphone and related circuits for signal extraction.

FIGS. 4A-4C show the frequency response of the graphene microphone in different configurations.

DETAILED DESCRIPTION

Figure 1A:
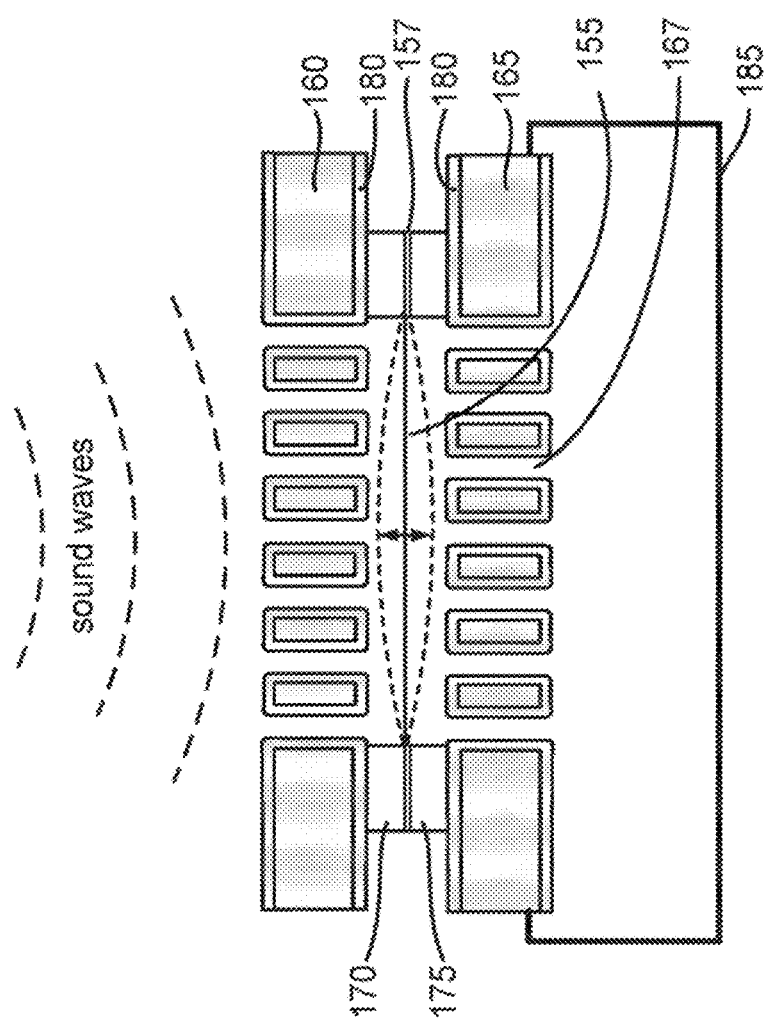
FIG. 1A shows an example of a cross-sectional schematic diagram of a graphene electrostatic wideband receiver (i.e., a graphene microphone).

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

INTRODUCTION

The ultra-low mass and high mechanical strength of graphene makes it attractive for sound transduction applications. An electrostatically-driven graphene diaphragm loudspeaker with an equalized frequency response across the whole human audible region (i.e., about 20 Hz-20 kHz) has previously been demonstrated. The ultimate high frequency cut-off of the loudspeaker was not determined, the measurement being limited to 20 kHz by available detection equipment; as shown below, however, the graphene loudspeaker operates to at least 0.5 MHz. Graphene allows air damping to dominate over the diaphragm's own mass and spring constant over a wide frequency range. In principle, graphene's exceptional mechanical properties and favorable coupling to air and other media could enable wideband transducers for both sound generation and reception, core requirements for ultrasonic acoustic radio. The term radio, as used in this application, is a system including a transmitter and a receiver.

In a conventional acoustic receiver (i.e., a microphone), air pressure variations from a sound wave induce motion of a suspended diaphragm; this motion is in turn converted to an electrical signal via Faraday induction (using a magnet and coil) or capacitively. The areal mass density of the diaphragm sets an upper limit on the frequency response of the microphone. In the human auditory system, the diaphragm (eardrum) is relatively thick (~100 μm), limiting flat FR to ~2 kHz and ultimate detection to ~20 kHz. In bats the eardrums are thinner, allowing them to hear reflected echo-location calls up to ~200 kHz.

Diaphragms in high-end commercial microphones can be engineered to provide flat frequency response from the audible region to ~140 kHz. In a microphone, thinner and lighter diaphragms allow for more faithful tracking of sound vibration at high frequencies, which usually necessitates smaller suspended area for structural integrity. A small diaphragm inevitably sacrifices low frequency response, mainly due to the increased effective stiffness of the diaphragm (which reduces the response vibration amplitude), and to inefficiencies in coupling. Small diaphragms also increase detection (i.e. electronic transduction) difficulties. Wideband microphones with equalized frequency response covering both audible and ultrasonic regimes are technically exceedingly challenging.

The successful design, construction, and operation of an ultrasonic acoustic radio is described herein. One component of the ultrasonic acoustic radio is an electrostatically-coupled, mechanically vibrating graphene diaphragm based receiver (i.e., a graphene microphone) that can be paired with the graphene-based acoustic transmitter. The graphene microphone has an outstanding equalized frequency response (within 10 dB variation of perfect flat-band response) covering at least 20 Hz to 0.5 MHz (limited by characterization instrumentation), and a sensitivity sufficient to record bats echo-locating in the wild. The efficient graphene ultrasonic transmitter/receiver radio system successfully codes, propagates, and decodes radio signals. The same ultrasonic acoustic radio can be used to accurately measure distances using interference between ultrasonic and electromagnetic waves.

DEVICES, SYSTEMS, AND METHODS

Figure 1B:
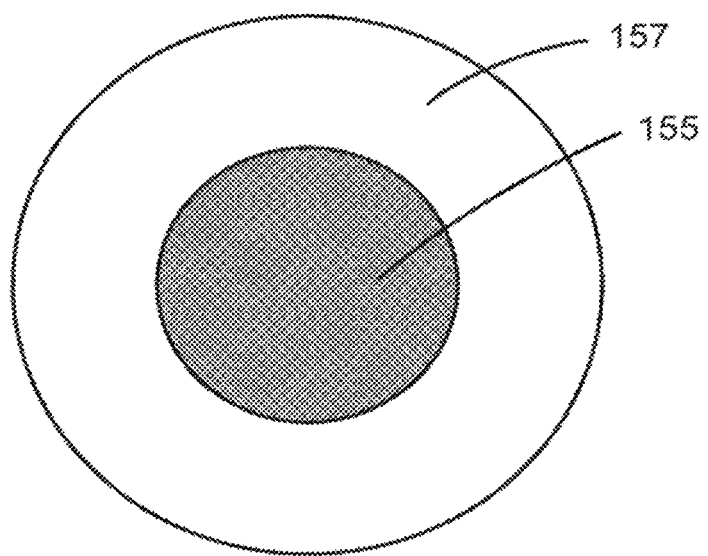
FIG. 1B shows an example of a graphene membrane suspended in a frame.

FIG. 1A shows an example of a cross-sectional schematic diagram of a graphene microphone 150. The graphene microphone 150 includes a graphene membrane 155 suspended in a frame 157 (see FIG. 1B for a top-down view) approximately midway between two electrodes 160 and 165. Two spacers 170 and 175 separate the graphene membrane 155 from the electrodes 160 and 165, respectively. In some embodiments, a spacing between the graphene membrane 155 and each of the electrodes 160 and 165 is about 50 microns to 1 millimeter (mm), or about 150 microns.

In some embodiments, the graphene membrane 155 is a monolayer graphene membrane (i.e., a single layer of graphene). In some embodiments, the graphene membrane 155 is a multilayer graphene membrane. For example, in some embodiments, the graphene membrane 155 includes 1 or more layers of graphene. In some embodiments, the graphene membrane 155 is about 0.34 nanometers (nm) (i.e., the thickness of a monolayer of graphene) to 1 micron thick, or about 20 nm thick. A graphene microphone with a thinner graphene membrane allows the microphone to respond to higher frequency sound waves.

The frame 157 may allow for handling the graphene membrane during the fabrication process of the graphene microphone 150. The frame 157 also may allow for a portion of the graphene membrane 155 to be suspended or not in contact with other materials. Suspending the graphene membrane 155 in the frame 157 in this manner may form a graphene diaphragm; a diaphragm is a sheet of a semi-flexible material anchored at its periphery. In some embodiments, the frame 157 is a disk of material defining a substantially circular open region, typically in a central portion of the disk. That is, in some embodiments, the frame 157 is similar to a hardware washer; a washer is a thin plate of material (typically disk-shaped) with a hole (typically circular and in the middle) though it. In some embodiments, the frame 157 is mounted to one side of the graphene membrane 155. In some embodiments, the frame is about 20 microns to 200 microns thick, or about 50 microns thick. In some embodiments, the frame has an outer diameter of about 500 microns to 6 centimeters (cm), or about 10 mm. The open region defined by the frame may have a diameter of about 100 microns to 5 cm, or about 8 mm.

In some embodiments, the frame includes other configurations. For example, the frame may define an open region having a rectangular, square, or oval shape, with the material of the frame designed to suspend the graphene membrane in this open region.

In some embodiments, the frame 157 is a non-conductive material. For example, in some embodiments, the frame 157 comprises a polymer or a ceramic. For example, in some embodiments, the frame 157 is a polyimide. Many different materials could be used for the frame, as long as the material has sufficient mechanical strength to support the graphene membrane 155 and to allow for incorporation of the frame 157 into the graphene microphone 150.

In some embodiments, the graphene membrane 155 is in electrical contact with a terminal (not shown). In some embodiments, the terminal is a metal wire. For example, in some embodiments, the terminal is a gold wire that is about 10 microns to 30 microns thick, or about 20 microns thick. In some embodiments, terminals of other materials and of other dimensions are used. In some embodiments, a portion of the graphene membrane 155 is disposed between the spacers 170 and 175. In some embodiments, electrical contact between the terminal and the graphene membrane 155 is in a region between the graphene membrane 155 and the spacer 170 or the spacer 175. In some embodiments, the terminal does not contact the graphene membrane 155 in the open regions defined by the spacers 170 and 175, which may allow for the graphene membrane 155 to vibrate in response to sound waves without the terminal interfering with the vibration.

In some embodiments, the spacers 170 and 175 are each disks of material defining a substantially circular open region, typically in a central portion of the disk. That is, in some embodiments, the spacers 170 and 175 are each similar to a hardware washer. In some embodiments, the spacers 170 and 175 comprise a non-conductive material. In some embodiments, the spacers 170 and 175 comprise a polymer or a ceramic. In some embodiments, the spacers 170 and 175 are each about 50 microns to 1 mm thick, or about 150 microns thick. With thicker spacers 170 and 175, the graphene membrane will be a further distance from the electrodes 160 and 165, and the microphone will produce a weaker signal (e.g., lower signal to noise ratio) in response to sound. In some embodiments, the spacers 170 and 175 are each thick enough to prevent the graphene membrane from contacting the electrodes 160 and 165.

In some embodiments, the electrodes 160 and 165 include perforations or openings 167 so that sound can cause the graphene membrane 155 in the graphene microphone 150 to vibrate. The perforations 167 are though-holes in the electrodes 160 and 165. The perforations 167 may have any cross-section. For example, in some embodiments, the perforations 167 have a square cross-section. In some embodiments, the perforations 167 have a circular cross-section. In some embodiments, the perforations 167 have a dimension of about 10 microns to 500 microns, or about 150 microns. For example, when the perforations 167 have a square cross-section, the side of a perforation may be about 10 microns to 500 microns; when the perforations 167 have a circular cross-section, the diameter of a perforation may be about 10 microns to 500 microns. In some embodiments, the electrodes are about 50 microns to 1000 microns thick, or about 300 microns thick.

The electrodes 160 and 165 may be a material that is able to conduct electricity. In some embodiments, the electrodes 160 and 165 are doped-silicon electrodes. In some embodiments, an oxide layer 180 or other insulating layer is deposited on or formed on the electrodes 160 and 165 to prevent the graphene membrane 155 from shorting to the electrodes 160 and 165. In some embodiments, the oxide layer 180 is about 400 nm to 600 nm thick, or about 500 nm thick. In some embodiments, the oxide layer is a $SiO_2$ layer.

In some embodiments, when the electrodes 160 and 165 are not conductive, layer 180 is a conductive material. For example, in some embodiments, the electrodes 160 and 165 comprise a polymer, a ceramic, or a semiconductor coated with a layer of conductive material 180. In some embodiments, the layer of conductive material 180 comprises a metal, such as copper, aluminum, silver, or gold, for example. For example, in some embodiments, the electrodes 160 and 165 comprise silicon, and the layer of conductive material 180 comprises gold. In some embodiments, the layer of conductive material 180 is about 10 nm to 30 nm thick, or about 20 nm thick.

In some embodiments, the graphene microphone 150 includes an acoustic cavity 185. Without an acoustic cavity 185, the sound pressure forces at the front and the backside of the graphene membrane 155 may tend to cancel at low frequencies, resulting in diminished response of the graphene microphone 150. The acoustic cavity 185 may allow the graphene microphone 150 to sense frequencies lower than about 200 Hz. In some embodiments, the acoustic cavity 185 serves to isolate or partially isolate the side of the graphene membrane 155 proximate the second electrode 165 from sound waves.

For example, the acoustic cavity 185 may be about 1 cm wide (e.g., wide enough to join with the sides or back side of the second electrode 165 and define a distance of about 5 cm from the graphene membrane 155 to a back wall of the acoustic cavity 185. The acoustic cavity 185 should be large enough so that air between the graphene membrane 155 and the acoustic cavity 185 is not unduly compressed during operation of the graphene microphone 150, which would reduce the performance of the graphene microphone 150.

In some embodiments, the graphene microphone 150 may not include the electrode 160 and the spacer 170. In some embodiments, the graphene microphone 150 may perform better (e.g., better frequency response) when the graphene microphone 150 includes the electrode 160 and the spacer 170. For example, the electrode 160 may serve to reduce the tension in the graphene membrane 155 so that the graphene microphone 150 is more responsive to lower frequency sounds.

In some embodiments, the frequency response of a graphene microphone is in the ultrasonic frequency range. In some embodiments, the frequency response of a graphene microphone includes the audible frequency range (e.g., about 20 Hz to 20 kHz) and the ultrasonic frequency range. In some embodiments, the frequency response of a graphene microphone is about 20 kHz to 10 GHz, about 200 kHz to 10 GHz, about 20 kHz to 10 MHz, or about 200 kHz to 10 MHz.

Figure 1C:
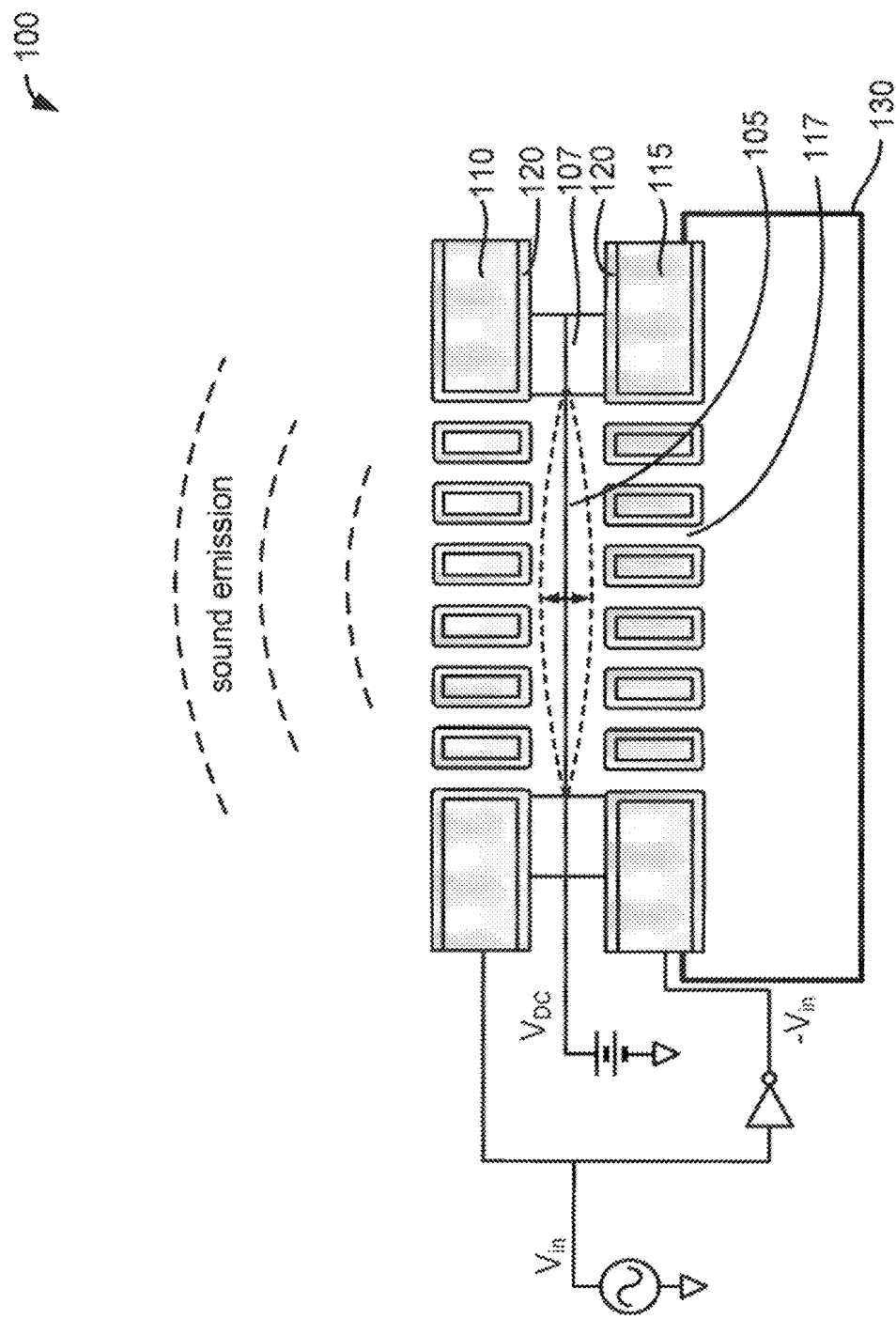
FIG. 1C shows an example of a cross-sectional schematic illustration of an electrostatically driven graphene speaker.

FIG. 1C shows an example of a cross-sectional schematic diagram of an electrostatically driven graphene loudspeaker (EDGS) 100. An embodiments of a graphene loudspeaker was previously described in U.S. patent application Ser. No. 14/737,903.

The loudspeaker 100 includes a graphene membrane 105 suspended in a frame 107 approximately midway between two electrodes 110 and 115. The graphene membrane 105 suspended in a frame 107 may be similar to the graphene membrane 155 suspended in the frame 157 shown in FIG. 1B, in some embodiments. In some embodiments, a spacing between the graphene membrane 105 and each of the electrodes 110 and 115 is about 50 microns to 1 mm, or about 150 microns.

In some embodiments, the graphene membrane 105 is a monolayer graphene membrane (i.e., a single layer of graphene). In some embodiments, the graphene membrane 105 is a multilayer graphene membrane. For example, the graphene membrane 105 may include about 1 to 100 layers of graphene. In some embodiments, the graphene membrane 105 is about 20 nm to 40 nm thick, or about 30 nm thick.

The frame 107 allows for a portion of the graphene membrane 105 to be suspended or not in contact with other materials. Suspending the graphene membrane 105 in the frame 107 in this manner may form a graphene diaphragm; a diaphragm is a sheet of a semi-flexible material anchored at its periphery. In some embodiments, the frame 107 is a disk of material defining a substantially circular open region, typically in a central portion of the disk. That is, in some embodiments, the frame is similar to a hardware washer; a washer is a thin plate of material (typically disk-shaped) with a hole (typically circular and in the middle) though it. In some embodiments, the frame is about 120 microns to 360 microns thick, or about 240 microns thick. In some embodiments, the frame has an outer diameter of about 7 mm to 21 mm, or about 14 mm. The open region defined by the frame may have a diameter of about 3 mm to 11 mm, or about 7 mm.

In some embodiments, the frame may include other configurations. For example, the frame may define an open region having a rectangular, square, or oval shape, with the material of the frame designed to suspend the graphene membrane in this open region.

In some embodiments, the graphene membrane 105 is mounted about midway along the thickness of the frame 107. For example, when the frame 107 is about 240 microns thick, the graphene membrane 105 may be mounted to the frame 107 such that about 120 microns of the frame extend from each side of the graphene membrane. In some embodiments, the graphene membrane is offset from the midpoint along the thickness of the frame.

In some embodiments, the frame 107 is a polymer, metal, or semiconducting material. Many different materials could be used for the frame, as long as the material has sufficient mechanical strength to support the graphene membrane 105 and to allow for incorporation of the frame 107 into the loudspeaker 100.

In some embodiments, the frame 107 includes two parts, such that the graphene membrane 105 is attached to one part of the frame and then the other part of the frame is stacked on top of the graphene membrane, sandwiching the graphene membrane between the two parts of the structure. For example, a graphene membrane could be suspended in a frame by aligning and attaching two hardware washer shaped parts to either side of the graphene membrane.

In some embodiments, the graphene membrane 105 is in electrical contact with a terminal (not shown). In some embodiments, the terminal is a metal wire. For example, in some embodiments, the terminal is a gold wire that is about 10 microns to 30 microns thick, or about 20 microns thick. In some embodiments, terminals of other materials and of other dimensions may be used.

The electrodes 110 and 115 are operable to actuate the graphene membrane 105. In some embodiments, the electrodes 110 and 115 include perforations 117 so that sound may be emitted from the loudspeaker 100. The perforations 117 are though-holes in the electrodes 110 and 115. The perforations 117 have any cross-section. For example, in some embodiments, the perforations 117 have a square cross-section. In some embodiments, the perforations 117 have a dimension of about 200 microns to 300 microns, or about 250 microns. For example, when the perforations 117 have a square cross-section, the side of a perforation may be about 200 microns to 300 microns; when the perforations 117 have a circular cross-section, the diameter of a perforation may be about 200 microns to 300 microns. In some embodiments, the electrodes are about 425 microns to 625 microns thick, or about 525 microns thick.

In some embodiments, one of the electrodes 110 or 115 includes perforations so that sound may be emitted from the loudspeaker 100. In some embodiments, the other electrode defines an open region, and does not necessarily include perforations. The open region may allow the graphene membrane to move; i.e., the open region may allow for air/gas to enter and exit from between the electrode and the membrane, which could hinder the movement of the membrane.

The electrodes 110 and 115 may be a material that is able to conduct electricity. In some embodiments, the electrodes 110 and 115 are doped-silicon electrodes. In some embodiments, an oxide layer 120 or other insulating layer is deposited on or formed on the electrodes 110 and 115 to prevent the graphene membrane 105 from shorting to the electrodes 110 and 115 at large drive amplitudes when the loudspeaker is in operation. In some embodiments, the oxide layer 120 is about 400 am to 600 nm thick, or about 500 nm thick. In some embodiments, the oxide layer is a $SiO_2$ layer.

In some embodiments, when the electrodes 110 and 115 are not conductive, layer 120 is a conductive material. For example, in some embodiments, the electrodes 110 and 115 comprise a polymer, a ceramic, or a semiconductor coated with a layer of conductive material 120. In some embodiments, the layer of conductive material 120 comprises a metal, such as copper, aluminum, silver, or gold, for example. For example, in some embodiments, the electrodes 110 and 115 comprise silicon, and the layer of conductive material 120 comprises gold. In some embodiments, the layer of conductive material 120 is about 10 nm to 30 nm thick, or about 20 nm thick.

In some embodiments, the graphene loudspeaker 100 includes an acoustic cavity 130. The acoustic cavity 130 may improve the low frequency performance of the graphene loudspeaker 100. In some embodiments, the acoustic cavity 130 of the graphene loudspeaker 100 is similar to the acoustic cavity 185 of the graphene microphone 150.

In some embodiments, a graphene microphone has a similar configuration as the graphene loudspeaker 100. In some embodiments, a graphene loudspeaker has a similar configuration as the graphene microphone 150.

In some embodiments, the graphene microphone and graphene loudspeaker may include a two-dimensional material other than graphene. A two-dimensional material is a material comprising or consisting of a single layer of atoms of molecules. For example, in some embodiments, the microphone and/or loudspeaker include a single-layer (i.e., a monolayer) of a two-dimensional material or multiple-layers (i.e., multiple monolayers) of a two-dimensional material. In some embodiments, the two-dimensional material comprises an electrically conductive material. For example, in some embodiments, the microphone and/or loudspeaker includes a single layer or multiple layers of hexagonal boron nitride (hBN) or molybdenum disulfide ($MoS_2$), with the hBN or $MoS_2$ having a thin carbon layer or a thin metal layer disposed thereon to make the hBN layer or $MoS_2$ layer conductive.

Figure 1D:
FIGS. 1D and 1E show examples of laminates of different two-dimensional materials.
Figure 1E:
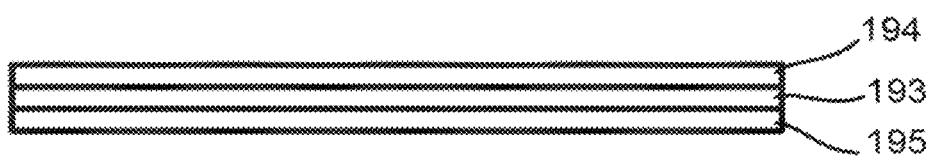

In some embodiments, the microphone and/or loudspeaker include laminates or stacks of different two-dimensional materials. For example, the microphone and/or loudspeaker may include one or more monolayers of hBN 191 laminated to or disposed on one or more monolayers of graphene 192, as shown in FIG. 1D. As another example, the microphone and/or loudspeaker may include one or more monolayers of graphene 193 with one or more layers of hBN 194 and 195 laminated to or disposed on each side of the one or more monolayers of graphene, as shown in FIG. 1E. A structure comprising one or more monolayers of graphene 193 with one or more layers of hBN 194 and 195 laminated to or disposed on each side of the one or more monolayers of graphene would prevent the graphene 193 from shorting to the electrodes, without an insulating layer disposed on the electrodes.

In some embodiments, the graphene microphone is fabricated from a multilayer graphene membrane suspended midway between two perforated electrodes. The external sound wave can then penetrate through the electrodes to displace the graphene membrane, thereby changing the capacitance between the graphene membrane and electrodes and causing charge redistribution and electrical current.

FIGS. 2A-2I show examples of schematic illustrations of a graphene microphone at various stages in a fabrication process. For example, the graphene microphones used in the experiments described below were fabricated using this method. The graphene membrane used in the graphene microphones was a multilayer graphene membrane about 20 nm thick and about 7 mm in diameter. A 1 $cm^2$ piece of 25-μm-thick nickel foil was first electrochemically polished, cleaned by DI water, and loaded into a 25 mm diameter quartz tube furnace (FIG. 2A). After hydrogen annealing, the graphene layers were grown by a chemical vapor deposition process at 1050° C. with 50 sccm methane and 50 sccm hydrogen co-flow. The growth chamber pressure was controlled at 1 Torr. The growth lasted 15 minutes and the methane flow rate was increased to 200 sccm for the last 2 minutes to improve the stitching between graphene grains. The foil was then quickly cooled to quench the graphene growth (FIG. 2B). After unloading, a layer of poly methyl methacrylate (PMMA) was spin-coated on top of the nickel foil (FIG. 2C), and the graphene membrane on the other side of the foil was etched away using an oxygen plasma (1 min @ 100 W) (FIG. 2D). A circular aperture of 8 mm diameter was created with a disc cutter on a sticky Kapton tape serving as a supporting frame. The supporting frame was then attached to the PMMA layer on the nickel foil (FIG. 2E). The nickel foil was subsequently etched away in 0.1 g/mL sodium persulfate solution (FIG. 2F). Compared to an iron chloride solution, the etch rate was much lower (typically overnight etching was needed to remove the 25-μm-thick nickel), and the resulting graphene membrane was clean and free of amorphous carbon. The exposed (not covered by the supporting frame) area of the PMMA layer was then dissolved in acetone, and the graphene membrane supported by the frame was cleaned twice with isopropanol and dried in air (FIG. 2G). The PMMA between the supporting frame and graphene serves as a buffer material and improves the yield to ~100% (the PMMA-free process has a typical yield of ~30%). In some instances, the graphene membrane was measured by light transmission to be approximately 20 nm thick, or 60 monolayers of graphene. A 25 μm diameter gold wire was attached to the edge of the graphene membrane for electrical contact (FIG. 2H). Finally, spacers approximately 150 m thick were attached to both sides of the frame, followed by perforated electrodes made from silicon wafers using deep reactive ion etch (DRIE). The rigid electrodes were also wired with gold wires attached by silver paste (FIG. 2I). The surfaces of the electrodes facing the graphene membrane were coated with conductive metal layers (20 nm sputtered gold) to allow ohmic contact between the gold wire and the electrodes. This gold coating is used to eliminate any contact barrier that could block the current flow during microphone operation, since the voltage variation on the graphene membrane is very small. Note that for loudspeaker applications, this metal coating is not needed since large voltages are there applied.

In some embodiments, operations of the method described above to fabricate a graphene microphone can be used to fabricate a graphene loudspeaker. Other methods may be used to fabricate a graphene microphone or a graphene speaker.

In some embodiments, a waveguide or a Helmholtz acoustic cavity is attached to the graphene microphone. A waveguide or a Helmholtz acoustic cavity can modify the frequency response of the graphene microphone in the low frequency region by altering the damping or creating/eliminating interference.

FIGS. 3A and 3B show examples of the operating principles of a graphene microphone and related circuits for signal extraction. In the embodiment shown in FIG. 3A, a large resistor R (e.g., 10 megaohm) is used to convert current into a voltage. The large resistor R restricts the current flow and lets the graphene membrane operate in constant charge mode, which converts the displacement of the membrane into a voltage signal. This is the manner in which a conventional microphone operates. This circuit, however, can present difficulties at higher frequencies because of parasitic capacitance in the transmission lines.

As can be seen in the equivalent circuit model in FIG. 3A, at higher frequencies the parasitic capacitance exhibits a small impedance and reduces the voltage drop across R. For example, even 1 pF of parasitic capacitance (e.g., equivalent to ~1 cm length of RG-58 coaxial cable) limits the circuit's response to ½ πRC=16 kHz. This may be acceptable for acoustic microphone circuits, but precludes detecting ultrasonic signals from about 20 kHz into the MHz range.

To circumvent the limitations of the conventional circuit of FIG. 3A, in some embodiments, a current sensing circuit similar to one used in fast photodiode signal detection is used. An embodiment of such a circuit is shown in FIG. 3B. As shown in FIG. 3B, a graphene microphone includes a graphene membrane 305, an electrode 310, and an electrode 315. In some embodiments, a circuit to convert the response of a graphene membrane 305 to sound to an electric signal includes an amplifier 325 and a resistor 320. The graphene membrane is connected (e.g., using a wire or a terminal) to a voltage source (not shown). The positive input of the amplifier 325 is connected to ground. The resistor 320 is connected to the negative input of the amplifier and an output of the amplifier 325.

In some embodiments, the electrode 310 is connected to ground. As noted above with respect to FIG. 1A, in some embodiments, a graphene microphone does not include the electrode 310. In some embodiments, however, the graphene microphone performs better (e.g., better frequency response) when the graphene microphone includes the electrode 310.

In some embodiments, the amplifier 325 is a low noise operational amplifier. In some embodiments, the amplifier 325 has a bandwidth of about 3 MHz to 9 MHz, or about 6.5 MHz. Higher bandwidth amplifiers may allow the graphene microphone to sense higher frequency sounds. However, higher bandwidth amplifiers may have a lower signal to noise ratio. In some embodiments, the amplifier 325 has a low input current noise. For example, a High-Speed Precision Difet OPERATIONAL AMPLIFIER, OPA602 (Texas Instruments, Dallas, Tex.) can be used as the amplifier 325.

In some embodiments, the resistor 320 has a resistance of about 1 megaohm to 10000 megaohms, about 1 megaohm to 100 megaohms, or about 10 megaohms. A resistor 320 with a larger resistance will generate a signal from the amplifier 325 with a higher signal to noise ratio. A resistor 320 with a larger resistance will, however, reduce the bandwidth of the graphene microphone; the high frequency response of the graphene microphone may be reduced. A resistor 320 with a large resistance may also cause the circuit to become unstable.

In some embodiments, the voltage source is operable to apply a positive or negative bias voltage of about 20 V to 1000 V, or about 30 V to 100 V, to the graphene membrane 305. The higher the voltage applied to the graphene membrane 305, the higher the signal to noise ratio of the signal generated from the amplifier 325.

The current sensing circuit shown in FIG. 3B can allow for a flat band circuit response from zero to ~0.5 MHz. The current sensing circuit measures the velocity of the vibrating membrane (i.e., vibrations in the membrane being induced by sound waves), allowing for reduction of the graphene membrane tension and operation of the graphene microphone in an over-damped region to acquire wider frequency response. The operational amplifier is configured so that the microphone electrode is directly connected to virtual ground. As a result, the parasitic capacitance in the equivalent circuit is effectively shorted, yielding $i_{out}=i_{mic}$ and $v_{out}=R \cdot i_{out}=R \cdot i_{mic}$. The output voltage is directly proportional to the microphone vibration and not affected by parasitic capacitance. The current sensing circuit shown in FIG. 3B also maintains a consistent gain at high frequencies. The circuitry shown in FIG. 3B was used in the experiments with the graphene microphone described below.

To determine the frequency response of a graphene microphone, the microphone was measured using a free-field method. Briefly, the frequency was swept on a commercial loudspeaker and the response of a commercial microphone was measured to obtain the frequency response $FR_1(f)$. Then the commercial microphone was replaced with the graphene microphone and the measurement was repeated to get $FR_2(f)$. The frequency response of the graphene microphone was acquired by taking the difference between the two measurements. This differential measurement method eliminates the responses of the loudspeaker, coupling, and driving/amplification circuits. Commercial microphones typically have a relatively flat frequency response within their operating range, and therefore this measurement provides a reasonable representation of the graphene microphone performance.

FIGS. 4A-4C show the frequency response of the graphene microphone in different configurations. FIG. 4A shows the frequency response of the graphene microphone in the audible region (20 Hz-20 kHz), referenced to a commercial condenser microphone. Here 0 dB corresponds to a response of 3.3 nA/Pa generated from the graphene membrane. A computer sound card based system with software was employed in collecting the data. The graphene microphone was contained in a Faraday cage made of copper mesh. Although in FIG. 4A the data are relatively flat above 500 Hz, there is a strong drop-off in response at lower frequencies (approaching ~60 dB/decade). This drop-off originates from the back-to-front cancellation of the graphene membrane mentioned previously, and becomes prominent when increasing wavelength allows sound to diffract around the microphone. Importantly, this decay is not intrinsic to the graphene membrane itself and the response can be improved with proper acoustic design.

An improved low-frequency response can readily be achieved by attaching an acoustic cavity to one side of the graphene microphone electrodes. As shown in FIG. 4B, by attaching an acoustic cavity to one side of the microphone electrodes, low-frequency interference was eliminated and the graphene microphone exhibited an intrinsic flat (<10 dB variation) frequency response across the whole audible region.

Due to the small areal mass density of the graphene membrane, the graphene microphone is expected to be responsive to frequencies well beyond the human hearing limit. However, measuring the frequency response in the ultrasonic region presents difficulties, mainly due to the lack of wideband reference microphones or loudspeakers in this region. As mentioned, piezoelectric ultrasonic transducers readily operate in the megahertz region, but only at their resonance frequency. A wideband electrostatic graphene loudspeaker was employed as the sonic transmitter and the electrostatic graphene microphone as the receiver. By measuring the total response with varying coupling between them, the response of one single transmitter/receiver can be isolated.

FIG. 4C shows the measured frequency response of a graphene microphone. A network analyzer was used for the measurement since the frequencies exceed the limits of a conventional computer sound card. The response appears to be relatively flat (within 10 dB) until ~0.5 MHz. Note that the measured maximum frequency of flat frequency response is only limited by the electronic amplification circuit, and can be extended using higher bandwidth operational amplifiers or with different detection methods such as optical detection. Combining this result with the low frequency measurements (shown in FIG. 4B), the graphene transmitter/receiver pair has intrinsic equalized frequency response (with variation less than 10 dB) from 20 Hz to at least 0.5 MHz, ideal for ultrasonic acoustic radio operation.

As an initial ultrasonic field test of a graphene microphone, ultrasonic bat calls were recorded. Bats often use echolocation to navigate and forage in total darkness. Bat call frequencies range from as low as 11 kHz to as high as 212 kHz, depending on the species. Bat sound signals (bat calls) were acquired in the field using a graphene microphone at Del Valle Regional Park, Livermore, Calif. where the bat species Western *Pipistrelle* (*Parastrellus hesperus*) is prevalent. A spectrogram showed that the bat calls consisted of periodic chirps during which the emitted frequency consistently decreases in frequency from ~100 kHz to ~50 kHz. The duration of each chirp was about 4 ms, and the repeating period was about 50 ms. It is believed that bats utilize the frequency sweeping technique to distinguish multiple targets, improve measurement accuracy, and avoid interference from each other. The bat frequency sweeping or chirping represents a form of ultrasonic FM radio transmission, and its successful recording demonstrates the effectiveness of the graphene microphone as an ultrasonic acoustic radio receiver.

Figure 5A:
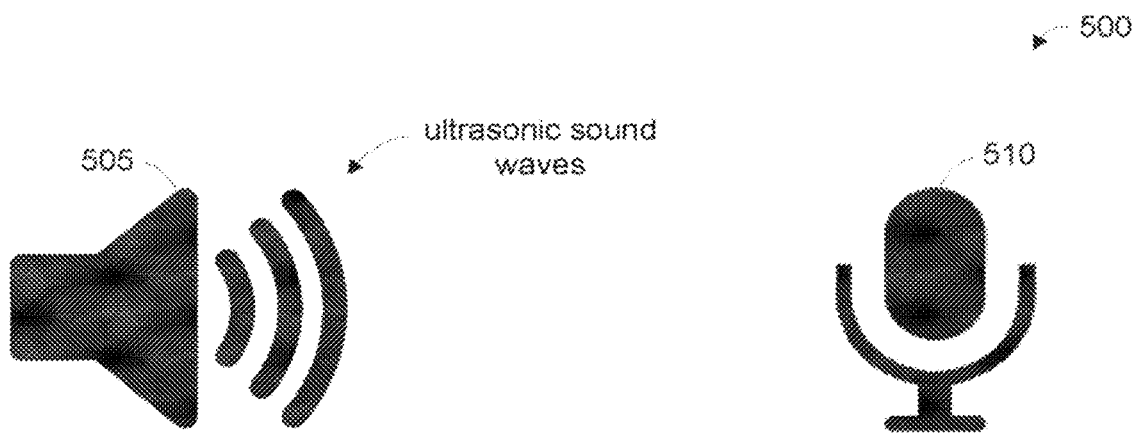
FIG. 5A shows a schematic illustration of an ultrasonic transmission and reception device (i.e., an ultrasonic acoustic radio).

FIG. 5A shows a schematic illustration of an ultrasonic transmission and reception device (i.e., an ultrasonic acoustic radio). As shown in FIG. 5, the ultrasonic device 500 includes a transmitter 505 and a receiver 510. The transmitter 505 may be any of the loudspeakers described herein. For example, the transmitter 505 may be the graphene loudspeaker 100 shown in FIG. 1C. The receiver 510 may be any of the microphones described herein. For example, the receiver 510 may be the graphene microphone 150 shown in FIGS. 1A and 1B.

Figure 5B:
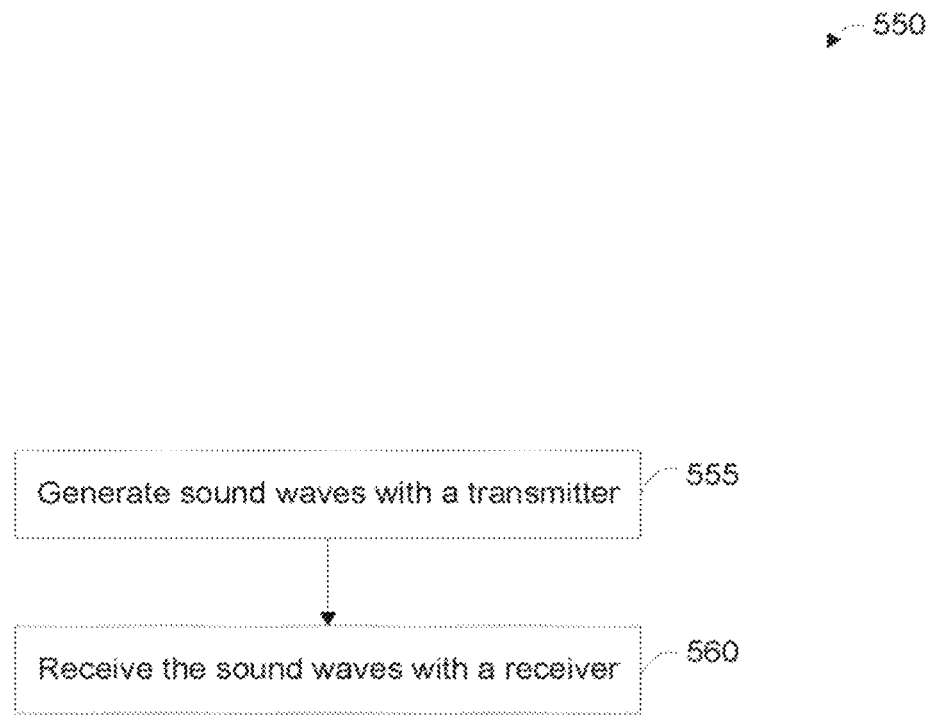
FIG. 5B shows an example of a flow diagram illustrating a method of use of the ultrasonic transmission and reception device.

FIG. 5B shows an example of a flow diagram illustrating a method of use of the ultrasonic transmission and reception device. At block 555 of the method 550, sound waves are generated with a transmitter. In some embodiments, the transmitter includes a graphene membrane. In some embodiments, the sound waves have a frequency of about 20 kHz to 10 GHz, about 200 kHz to 10 GHz, about 20 kHz to 10 MHz, or about 200 kHz to 10 MHz. For example, the sound waves may be generated with the transmitter 505 shown in FIG. 5A.

At block 560, the sound waves are received with a receiver. In some embodiments, the receiver includes a graphene membrane. For example, the sound waves may be received with the receiver 510 shown in FIG. 5A. The sound waves received with the receiver may have a low power. For example, the power of a sound wave received by the receiver may be about 1 femtowatt (i.e., $1 \times 10^{-15}$ watts) or greater.

With the method 550 shown in FIG. 5B, different frequencies may be transmitted and received. For example, the method 550 may be performed, transmitting and receiving a first frequency sound wave, and then the method 550 may be repeated, transmitting and receiving a second frequency sound wave. In some embodiments, the first and the second frequencies are both in the ultrasonic frequency range. In some embodiments, the first and the second frequencies are separated from one another in frequency by at least about 50 Hz, at least about 100 Hz, at least about 1 kHz, or at least about 10 kHz. For example, the first frequency may be about 20 kHz to 200 kHz, and the second frequency may be about 500 MHz to 1.5 GHz.

In some embodiments, the sound wave is used to transmit information. For example, in some embodiments, the sound wave includes an amplitude modulation. The amplitude of the sound wave is varied in proportion to the waveform being transmitted with amplitude modulation. In some embodiments, the sound wave includes a frequency modulation. The frequency of the sound wave is varied in proportion to the waveform being transmitted with frequency modulation. Amplitude modulation or frequency modulation of the sound wave allows the sound wave to include or carry information. For example, electronics associated with the transmitter 505 can vary the amplitude or frequency of the sound wave to encode information in the sound wave. Electronics associated with the receiver 510 can demodulate the received sound wave to extract the information.

In some embodiments, the sound wave is used to transmit power from the transmitter to the receiver. For example, power could be transmitted with the sound wave to power a device or to charge the batteries of a device. In some embodiments, the sound wave has a power of about 500 milliwatts to 5 watts, or about 1 watt. After the sound wave is received at the receiver, it can be converted to DC power. Charging the batteries in a device using ultrasonic sound waves may be beneficial compared to charging the batteries in a device using electromagnetic induction; with ultrasonic sound waves, the transmitter and the receiver may be further apart from one another compared to electromagnetic induction.

Figure 6A:
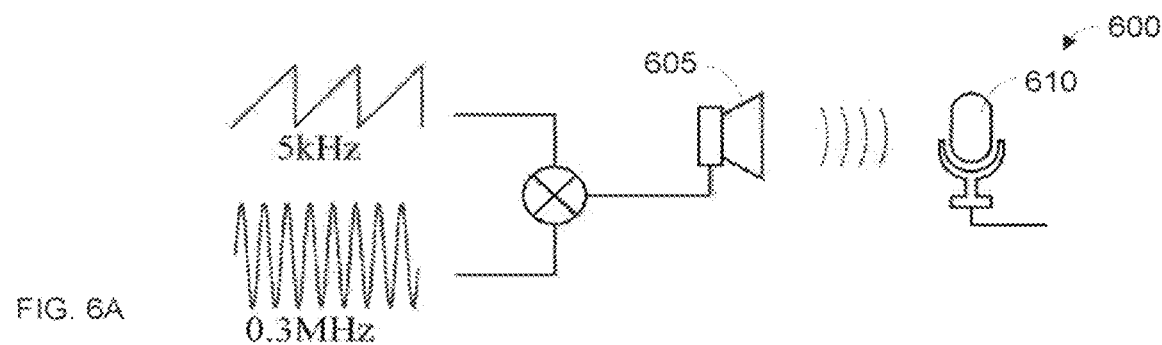
FIGS. 6A-6C show examples of the performance of an ultrasonic transmission and reception device.
Figure 6B:
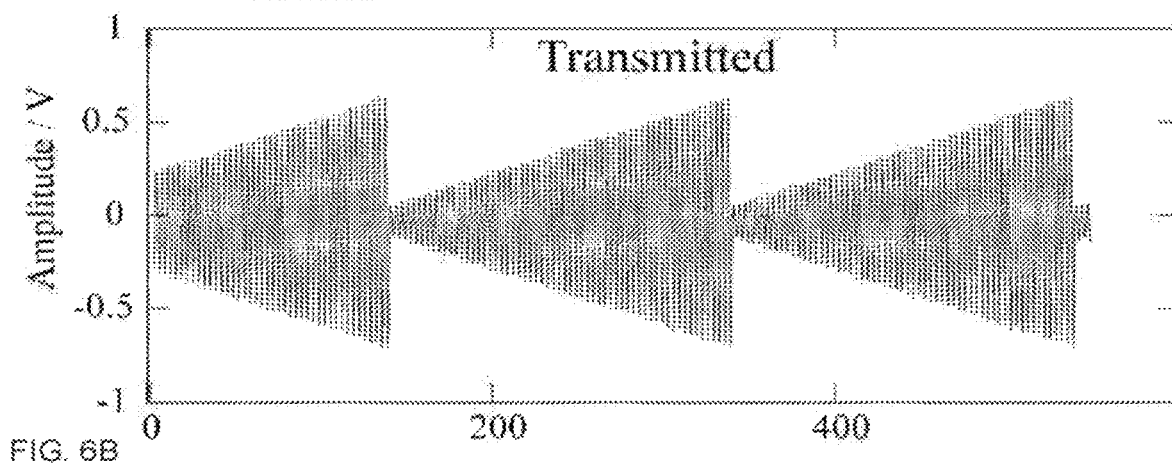
Figure 6C:
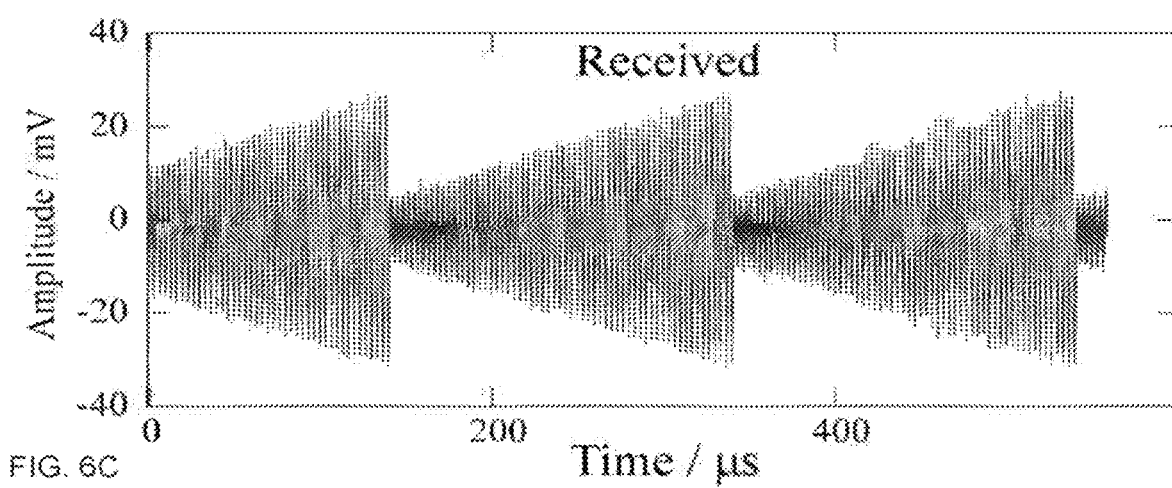

FIGS. 6A-6C show examples of the performance of an ultrasonic transmission and reception device. FIG. 6A shows an example of an ultrasonic transmission and reception device 600, including a transmitter 605 and a receiver 610. The transmitter 605, for example, may any of the graphene loudspeakers described herein. The receiver, for example, may be any of the graphene microphones described herein.

To avoid any possible EM radiation influences, both the transmitter and the receiver were placed inside Faraday cages where EM communication is not possible. An electronic 0.3 MHz carrier sine wave with a 5 kHz sawtooth wave (90% amplitude modulation (AM)) was modulated. The mixed signal was monitored by an oscilloscope (FIG. 6B). The electrical signal was sent to the graphene transmitter which transmits the ultrasonic signal into air. The frequencies after mixing are well above the human hearing limit and so inaudible. FIG. 6C shows the ultrasonic signal detected and reconverted to an electrical signal by the graphene receiver. The received signal accurately replicates the transmitted one and information is transmitted with high fidelity. Note that the sharp sawtooth modulation expands the single delta-function-like peak of the sine wave in the frequency domain to a much wider peak; the wideband property of the graphene ultrasonic acoustic radio is essential to preserve the shape of the sawtooth (i.e. coded information). Narrowband piezoelectric ultrasonic transducers lack this property.

Another use of the ultrasound transmission and reception device is for position detection, i.e., range finding. Using ultrasonics for position detection is well established, and using graphene transmitter and receiver in a highly directional sonar-like reflection configuration is certainly possible. Here a different implementation, electro-acoustic interference, is considered.

Figure 7A:
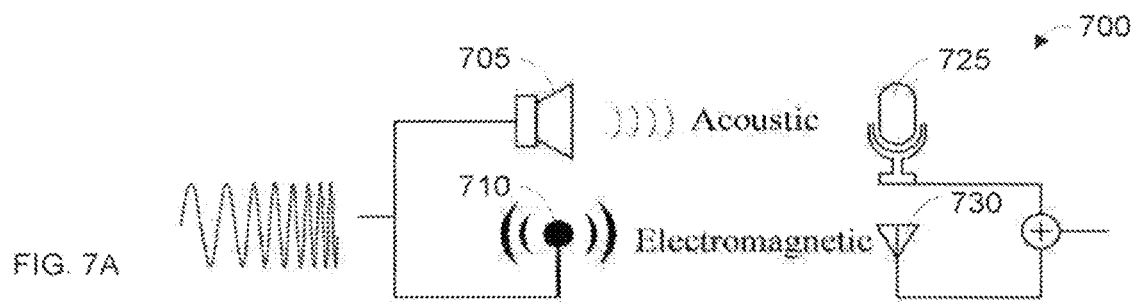
FIGS. 7A and 7B show an example of a schematic illustration of a distance-measuring device that can exploit interference between acoustic and electromagnetic (EM) signals and the signal obtained from such a device.
Figure 7B:
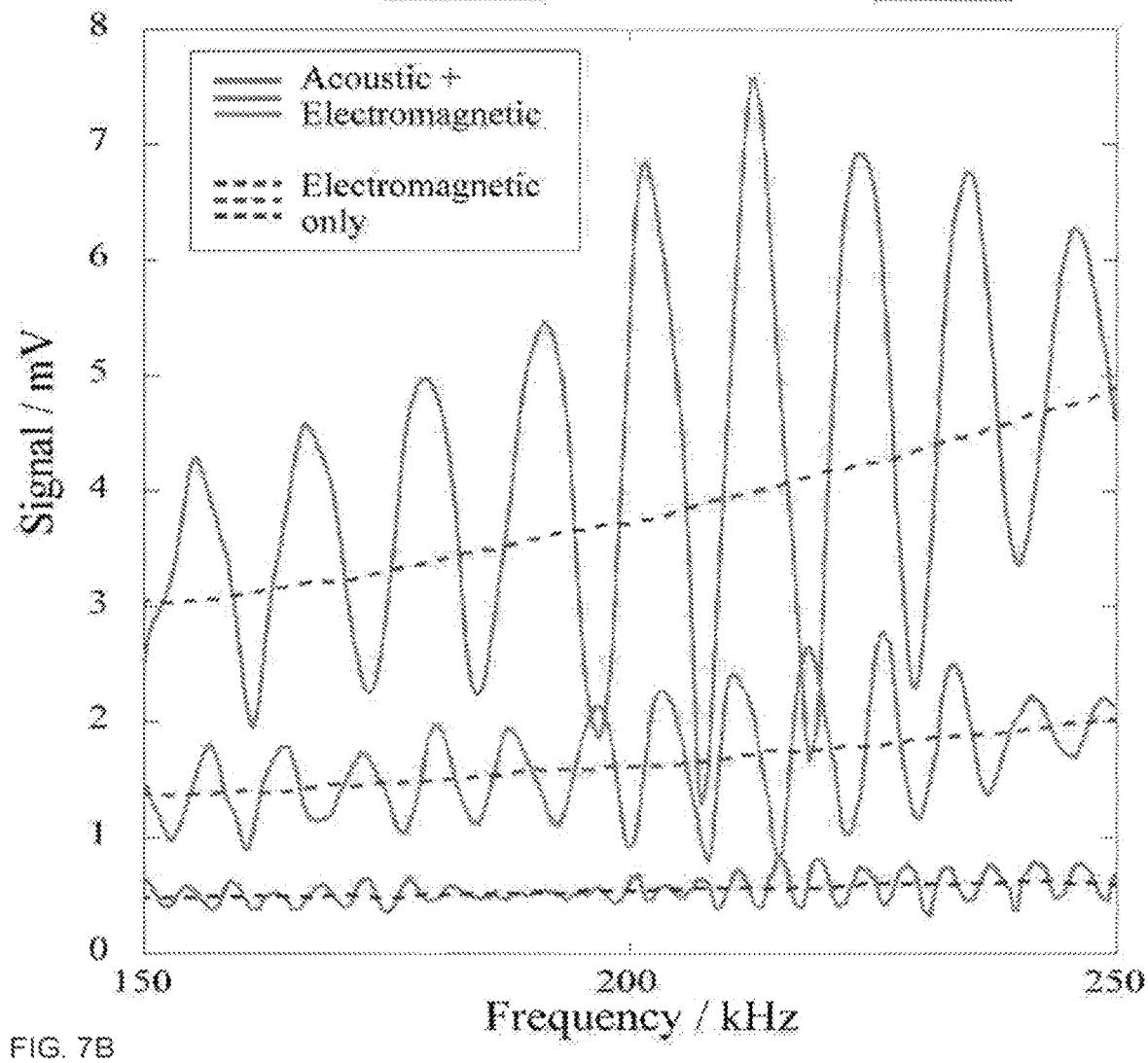

FIGS. 7A and 7B show an example of a schematic illustration of a distance-measuring device 700 that can exploit interference between acoustic and electromagnetic (EM) signals and the signal obtained from such a device. A graphene transmitter 705 is operable to transmit an acoustic wave as well as an EM wave of the same frequency (an EM antenna 710 is added to the graphene transmitter 705 drive electronics). A graphene receiver 725 a distance L away receives an acoustic signal along with the EM signal (an EM receiver antenna 730 is added to the transducer electronics on the graphene receiver 725).

Since sound propagates much slower than EM waves, the sound signal picked up by the graphene membrane of the receiver 725 will develop a phase difference relative to the EM signal of the electronic receiver antenna 730.

As seen in FIG. 7B, when a frequency sweep is performed, the interference alternates between constructive and destructive due to the change in the wavelength λ. The condition for constructive interference is $$\frac{L}{\lambda} = n$$

where L is the distance between the receiver and the transmitter, λ is the wavelength of the sound wave, and n is an integer. The nearest two constructive peaks should obey $$\frac{L}{\lambda_1} = n, \text{ and } \frac{L}{\lambda_2} = n+1.$$

Using λ=v/f, where v is the sound velocity and f is the frequency, we obtain $$\frac{L}{v}(f_2 - f_1) = 1, \text{ or } L = \frac{v}{\Delta f}$$

The distance L equals the sound velocity divided by the frequency difference Δf of two nearest constructive interference peak. The graphene transmitter/receiver pair was placed at three different distances apart, at 30 mm, 45 mm, and 85 mm. The measured frequency sweep is shown from top to bottom in three groups in FIG. 7B. When the pair is further apart, the signal is weaker, and the frequency difference between two constructive peaks also becomes smaller. By fitting the peaks, the frequency differences Δf of 11.28±0.08 kHz, 7.657±0.003 kHz, and 4.05±0.07 kHz, respectively, were found. Using a sound velocity of 344 m/s, this corresponds to a measured distance of 30.49±0.22 mm, 44.92±0.02 mm, and 84.94±0.84 mm. Thus, sub-millimeter accuracy is easily achieved with this simple electro-acoustic frequency sweep configuration.

Electric Modeling of the Graphene Microphone

The electrically conducting vibrating graphene diaphragm forms a variable capacitor with the fixed electrodes, with capacitance $$C = \frac{\epsilon A}{x}$$

where ε is vacuum permittivity, A is the area of the graphene membrane, and x is the distance from one of the electrodes to the graphene membrane. When the diaphragm is dc biased at V~50 V, charge is induced on the electrodes, described by Q=CV. The vibration of the diaphragm varies the system capacitance and induces charge variation on the electrodes, creating a current $$i = \frac{dQ}{dt} = \frac{d(CV)}{dt} = V\frac{d(\epsilon A/x)}{dt} = -V\epsilon A \frac{1}{x^2}\frac{dx}{dt} = -\frac{V\epsilon A}{x^2}u$$

where u is the velocity of the membrane relative to the electrode. Hence, the graphene microphone can be modeled as a current source with an infinitely large internal resistance, where the current encodes the sound wave. In the thin membrane limit where the graphene diaphragm vibrates together with air, u equals the local velocity field of the air, whose amplitude U is $$U = \frac{p}{z}$$

where p is the sound pressure level (SPL), and Z=400 N·s·m$^{-3}$ is the acoustic impedance of air. Thus the amplitude of the microphone current source is directly proportional to the loudness of the sound, and independent of sound frequency. Using the second and third equations, with V=50 V, A=25 mm$^2$, and x=150 μm, we find that at 40 dB SPL (approximately soft conversation at 1 m) the current amplitude is 2 pA. This level of current can be reliably measured with careful design of the signal conditioning circuit.

Conventional Microphone Operation Compared to Graphene Microphone Operation

Figure 8:
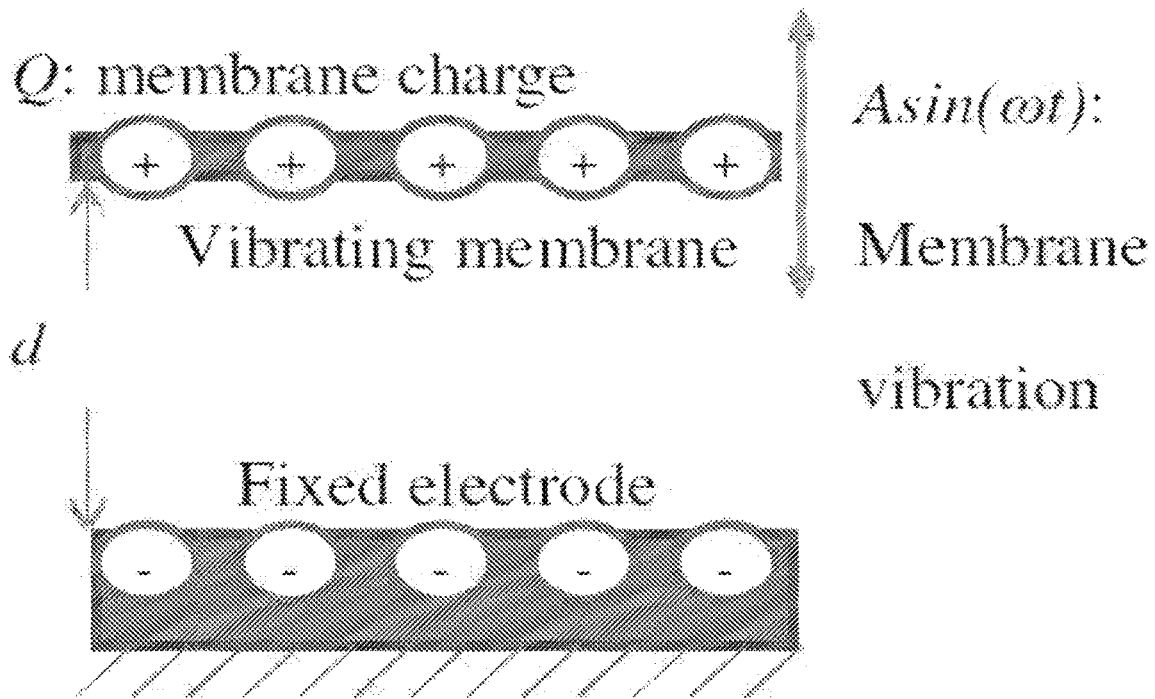
FIG. 8 shows an example of the operation of a conventional microphone.

A traditional microphone measures the voltage variation of the vibrating membrane. The operation is shown in FIG. 8. The operation of the microphone shown in FIG. 8 can be implemented with the circuit shown in FIG. 3A. In a traditional microphone, the membrane is connected to a very large resistor, and the charge Q stays almost constant during operation. Gauss's law gives us the voltage drop between two plates with charge Q:

$$V = Ed = \frac{Q(d_0 + A\sin(\omega t))}{S\varepsilon}$$

where Q is the charge on membrane, $d_0$ is the distance between membrane and the electrode at a balanced position, S is the area of the membrane, A sin(ωt) is the membrane vibration displacement with amplitude A, and e is vacuum permittivity. We see that if we measure the voltage response, the AC portion is proportional to A, the amplitude of vibration displacement.

In this case an over-damped system does NOT generate flat-band response. If we model the system as a harmonic oscillator, the equation is:

$$m\ddot{x} + \zeta\dot{x} + kx = F$$

where m is the membrane mass, ζ is the damping coefficient, k is the spring constant, and F is the driving force applied on the membrane, which equals the sound pressure SP sin(ωt). The solution of the vibration amplitude is:

$$A = |x| = \frac{SP}{|\zeta\omega - ik + i\omega^2 m|}.$$

If the system is over-damped, the damping term ζω will dominate over other terms, therefore results in A~ω$^{-1}$. This means that the measured voltage signal will also decrease as the frequency increases. This is the case for traditional microphone where a relatively high tension membrane is desired, so that the spring constant term k can dominate to have flat-band response.

Figure 9:
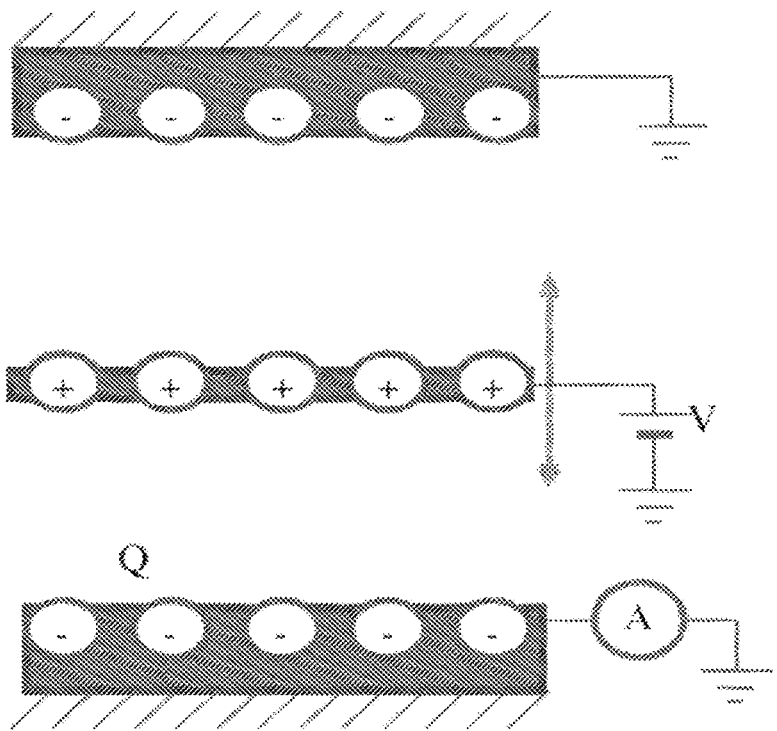
FIG. 9 shows an example of the operation of a graphene microphone.

As described above, the graphene microphone uses the current sensing mechanism to support working in the high frequency region. FIG. 9 shows an example of the operation of a graphene microphone. As shown in the FIG. 9, the circuit is actually measuring the vibration velocity, instead of the displacement. The operation of the microphone shown in FIG. 9 can be implemented with the circuit shown in FIG. 3B.

The graphene membrane is held at voltage V. The amount of charge on the graphene membrane is actually changing, generating a current where we extract the vibration information. The charge on the graphene membrane, or on the fixed electrode, can be computed using a parallel plate capacitor:

$$Q = CV = \frac{\varepsilon SV}{d} = \frac{\varepsilon SV}{d_0 + A\sin(\omega t)}$$

The vibration amplitude is usually much smaller than the distance between the graphene membrane and the electrode, so at $A \ll d_0$ we can Taylor expand the expression to the first order:

$$Q \approx \frac{\varepsilon SV}{d_0}\left[1 - \frac{A}{d_0}\sin(\omega t)\right]$$

The time variation of charge is the measured current:

$$i = \frac{dQ}{dt} = -\frac{\varepsilon SVA\omega}{d_0^2}\cos(\omega t)$$

We see here that the amplitude of the measured current is proportional to $A\omega$.

Now, going back to the motion equation, we find:

$$|i| \propto A\omega = \frac{SP}{|\zeta - ik/\omega + i\omega m|}$$

Therefore, an over-damped system, where the damping term $\zeta$ dominates over other terms, results in a constant current amplitude, i.e. a flat-band frequency response.

CONCLUSION

An electrostatic graphene ultrasonic acoustic radio with ideal equalized frequency response from about 20 Hz to 0.5 MHz has been demonstrated. The receiver component has been independently field-tested in recording wild bat calls. Amplitude- and frequency-modulated communication has been demonstrated, and a novel electro-acoustic range finding method has been established with the ultrasonic radio having sub-millimeter accuracy.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A system comprising:
a transmitter; and
a receiver comprising a membrane, the membrane comprising a single layer or multiple layers of a two-dimensional material, the receiver operable to receive sound waves,
wherein the membrane comprises a graphene membrane,
wherein the membrane is attached to a frame having an aperture, wherein a first spacer is arranged between the frame and a first electrode and a second spacer is arranged between the frame and a second electrode,
wherein the membrane has a diameter of about 3 millimeters (mm) to about 11 mm.

2. The system of claim 1,
wherein the sound waves include an amplitude modulation.

3. The system of claim 1,
wherein the sound waves include a frequency modulation.

4. The system of claim 1,
wherein the receiver is operable to receive sound waves across a frequency range of about 20 kHz to 10 MHz.

5. The system of claim 1,
wherein the receiver is operable to receive sound waves across a frequency range of about 200 kHz to 10 MHz.

6. The system of claim 1, wherein the receiver further comprises:
a circuit associated with the first electrode, wherein the circuit is operable to measure a velocity of vibration of the membrane, wherein the vibration is caused by the sound waves.

7. The system of claim 6,
wherein the circuit comprises an amplifier, and wherein the amplifier comprises a low noise operational amplifier.

8. The system of claim 6,
wherein the circuit comprises a resistor, and wherein the resistor has a resistance of about 1 megaohm to 10000 megaohms.

9. The system of claim 6,
wherein the circuit comprises a voltage source, and wherein the voltage source is operable to apply a voltage of about 20 volts to 1000 volts to the membrane.

10. The system of claim 1,
wherein a buffer material is arranged between the membrane and the frame.

11. A system comprising:
a transmitter; and
a receiver comprising a membrane, the membrane comprising a single layer or multiple layers of a two-dimensional material, the receiver operable to receive sound waves,
wherein the membrane comprises a graphene membrane,
wherein the membrane is attached to a frame having an aperture arranged approximately midway between a first electrode and a second electrode, wherein a first spacer is arranged between the frame and the first electrode and a second spacer is arranged between the frame and the second electrode,
wherein a buffer material is arranged between the membrane and the frame.

12. The system of claim 11,
wherein the sound waves include an amplitude modulation.

13. The system of claim 11,
wherein the sound waves include a frequency modulation.

14. The system of claim 11,
wherein the receiver is operable to receive sound waves across a frequency range of about 20 kHz to 10 MHz.

15. The system of claim 11,
wherein the receiver is operable to receive sound waves across a frequency range of about 200 kHz to 10 MHz.

16. The system of claim 11, wherein the receiver further comprises:
a circuit associated with the first electrode, wherein the circuit is operable to measure a velocity of vibration of the membrane, wherein the vibration is caused by the sound waves.

17. The system of claim 16,
wherein the circuit comprises an amplifier, and wherein the amplifier comprises a low noise operational amplifier.

18. The system of claim 16,
wherein the circuit comprises a resistor, and wherein the resistor has a resistance of about 1 megaohm to 10000 megaohms.

19. The system of claim 16,
wherein the circuit comprises a voltage source, and wherein the voltage source is operable to apply a voltage of about 20 volts to 1000 volts to the membrane.

20. A device comprising:
a membrane comprising a single layer or multiple layers of a two-dimensional material;
a first electrode proximate a first side of the membrane; and
a circuit associated with the first electrode, the circuit being operable to measure a velocity of vibration of the membrane, the vibration being caused by sound waves,
wherein the membrane comprises a graphene membrane,
wherein the membrane is attached to a frame having an aperture, wherein a first spacer is arranged between the frame and the first electrode and a second spacer is arranged between the frame and a second electrode,
wherein the device is operable to generate an output signal through the circuit in response to the sound waves,
wherein the membrane has a diameter of about 3 millimeters (mm) to about 11 mm.

21. The device of claim 20,
wherein the sound waves include an amplitude modulation.

22. The device of claim 20,
wherein the sound waves include a frequency modulation.

23. The device of claim 20,
wherein the device is operable to generate an output signal in response to the sound waves across a frequency range of about 20 kHz to 10 MHz.

24. The device of claim 20,
wherein the device is operable to generate an output signal in response to the sound waves across a frequency range of about 200 kHz to 10 MHz.

25. The device of claim 20, wherein the receiver further comprises:
a circuit associated with the first electrode, wherein the circuit is operable to measure a velocity of vibration of the membrane, wherein the vibration is caused by the sound waves.

26. The device of claim 25,
wherein the circuit comprises an amplifier, and wherein the amplifier comprises a low noise operational amplifier.

27. The device of claim 25,
wherein the circuit comprises a resistor, and wherein the resistor has a resistance of about 1 megaohm to 10000 megaohms.

28. The device of claim 25,
wherein the circuit comprises a voltage source, and wherein the voltage source is operable to apply a voltage of about 20 volts to 1000 volts to the membrane.

29. The device of claim 20,
wherein a buffer material is arranged between the membrane and the frame.

30. A device comprising:
a membrane comprising a single layer or multiple layers of a two-dimensional material;
a first electrode proximate a first side of the membrane; and
a circuit associated with the first electrode, the circuit being operable to measure a velocity of vibration of the membrane, the vibration being caused by sound waves,
wherein the membrane comprises a graphene membrane,
wherein the membrane is attached to a frame having an aperture arranged approximately midway between the first electrode and a second electrode, wherein a first spacer is arranged between the frame and the first electrode and a second spacer is arranged between the frame and the second electrode,
wherein the device is operable to generate an output signal through the circuit in response to the sound waves,
wherein a buffer material is arranged between the membrane and the frame.

31. The device of claim 30,
wherein the sound waves include an amplitude modulation.

32. The device of claim 30,
wherein the sound waves include a frequency modulation.

33. The device of claim 30,
wherein the device is operable to generate an output signal in response to the sound waves across a frequency range of about 20 kHz to 10 MHz.

34. The device of claim 30,
wherein the device is operable to generate an output signal in response to the sound waves across a frequency range of about 200 kHz to 10 MHz.

35. The device of claim 30, wherein the receiver further comprises:
a circuit associated with the first electrode, wherein the circuit is operable to measure a velocity of vibration of the membrane, wherein the vibration is caused by the sound waves.

36. The device of claim 35,
wherein the circuit comprises an amplifier, and wherein the amplifier comprises a low noise operational amplifier.

37. The device of claim 35,
wherein the circuit comprises a resistor, and wherein the resistor has a resistance of about 1 megaohm to 10000 megaohms.

38. The device of claim 35, wherein the circuit comprises a voltage source, and wherein the voltage source is operable to apply a voltage of about 20 volts to 1000 volts to the membrane.

* * * * *